US006819805B2

(12) United States Patent
Usikov

(10) Patent No.: US 6,819,805 B2
(45) Date of Patent: Nov. 16, 2004

(54) METHOD AND APPARATUS FOR BRIGHTNESS EQUALIZATION OF IMAGES TAKEN WITH POINT SOURCE ILLUMINATION

(75) Inventor: Daniel Usikov, Foster City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 591 days.

(21) Appl. No.: 09/847,918

(22) Filed: May 2, 2001

(65) Prior Publication Data

US 2003/0012449 A1 Jan. 16, 2003

(51) Int. Cl.[7] ............................................... G06T 15/50
(52) U.S. Cl. ....................................... 382/274; 382/131
(58) Field of Search ................................. 382/131, 274

(56) References Cited

U.S. PATENT DOCUMENTS

| | | | | |
|---|---|---|---|---|
| 4,436,684 A | * | 3/1984 | White ........................ 264/138 |
| 4,573,070 A | * | 2/1986 | Cooper ........................ 348/617 |
| 4,709,231 A | * | 11/1987 | Sakaibara et al. .......... 345/426 |
| 5,502,799 A | * | 3/1996 | Tsuji et al. .................. 345/600 |
| 5,835,207 A | * | 11/1998 | Sugiura et al. ............. 356/124 |
| 6,128,637 A | * | 10/2000 | Yasui et al. ................. 708/290 |

* cited by examiner

Primary Examiner—Leo Boudreau
Assistant Examiner—Dennis Rosario-Vasquez

(57) ABSTRACT

A method and apparatus correct for image brightness of images taken of an object with point source illumination in an imaging system. The brightness correction method and apparatus of the present invention correct for the non-object related brightness characteristics of a point source illumination in the observed or measured brightness of a relatively planar object being imaged by the imaging system. The method and apparatus are applicable to imaging and inspection systems used with a wide variety of planar and semi-planar objects including but not limited to X-ray inspection of printed circuit boards (PCBs) and integrated circuits.

21 Claims, 2 Drawing Sheets

METHOD AND APPARATUS FOR BRIGHTNESS EQUALIZATION OF IMAGES TAKEN WITH POINT SOURCE ILLUMINATION

TECHNICAL FIELD

The invention relates to imaging systems. In particular, the invention relates to imaging systems using point source illumination.

BACKGROUND ART

Imaging systems are used in a wide variety of important and often critical applications, including but not limited to, identification and inspection of objects of manufacture. In general, imaging systems either employ ambient illumination or provide an illumination source to illuminate an object being imaged. In the most familiar imaging systems, the illumination source is based on some form of electromagnetic radiation, such as microwaves, infrared, visible light, Ultraviolet light, or X-rays. Aside from various forms of electromagnetic radiation, the other most commonly employed illumination source found in modern imaging systems is one that is based on acoustic vibrations as such as is found in ultrasound imaging systems and Sonar systems.

The imaging system forms an image or picture of an object by measuring and recording a response from the object to the illumination produced by the source. In addition to utilizing a variety of illumination sources, imaging systems known in the art employ a variety of illumination source geometries to facilitate imaging. The illumination source geometry defines the relative location and orientation of the illumination source with respect to the object. Among the common illumination geometries used in imaging systems that provide an illumination source are collimated illumination, coaxial illumination and point source or isotropic illumination. Point source illumination is illumination using an isotropic source located near to the object and therefore, also sometimes is referred to as isotropic illumination.

An example of the use of point source geometry in conjunction with X-ray illumination can be found in X-ray laminography. X-ray laminography is an imaging technique that facilitates the inspection of features at various depths within an object. Usually, an X-ray laminography imaging system combines multiple images taken of the object to produce a single image. The multiple images are often produced by moving an X-ray point source around the object and taking or recording the images using different point source locations. By taking images when the source is at various locations during the movement of the source, the combined image is able to depict characteristics of the internal structure of the object. In some instances, such as in analog laminography, the images are combined directly during the process of taking the images. In digital X-ray laminography, the individual images are combined digitally to produce a combined image. An application of X-ray laminography is the inspection of multilayer printed circuit boards (PCBs) and integrated circuits used in electronic devices.

The illumination of an object by a point source of illumination located above but relatively close to the object, such as an X-ray source used in conventional X-ray laminography, does not produce uniform illumination of the object. Instead, the illumination tends to vary across the surface of a plane upon which the object is resting as a function of distance from the point source. The illumination variation or unevenness is due to the point source acting as an isotropic radiator. An isotropic radiator exhibits a decrease or diminution in radiation or illumination intensity that is entirely a function of distance, as opposed to a function of distance and direction. The non-uniform illumination produced by the point source on a planar surface results in an apparent variation of brightness in the image produced. In traditional analog X-ray laminography, the brightness variations are generally not a problem because the relative motion between the object and X-ray source during the imaging process are configured such that when the images are combined, the effects of the non-uniform illumination are averaged out.

On the other hand, the brightness variation or brightness unevenness due to point source illumination can and does interfere with imaging applications that do not combine the images as in traditional laminography. In general, brightness variations across an illuminated object in an imaging system are used as the basis for constructing the image. Therefore, brightness variations associated with the characteristics of point source illumination can and do interfere with the quality of the image, since these variations are not a function of the object being imaged, but instead are a function of the illumination geometry. For example, 3D digital tomography can utilize a series of images taken from various illumination angles to reconstruct a 3-dimensional representation of the object being imaged. Point source illumination effects tend to interfere with the reconstruction of the 3-dimensional imaging created by 3D tomography due to the aforementioned unevenness of the illumination.

Accordingly, it would be advantageous to have a method and apparatus for brightness correction that could minimize or largely eliminate the effects of using a point source to illuminate an object. In addition, it would be desirable if the method and apparatus did not require precise knowledge of the relative locations of the point source and the object to accomplish brightness correction. Such a method and apparatus would solve a long-standing need in the area of imaging systems using point source illumination geometries.

SUMMARY OF THE INVENTION

The present invention is a novel method and apparatus of brightness correction or brightness compensation for use in imaging systems employing a point source of illumination. The brightness correction method and apparatus of the present invention perform correction by compensating for the difference in distance from the point source to various points on the surface of a plane or to the planar-like surface of the object itself. Generally, the method and apparatus of brightness correction utilize knowledge of the location of the source relative to the planar surface. However, advantageously the method and apparatus may be applied to correct for brightness variation in the absence of accurate and precise knowledge of the location of the point source. The method and apparatus are applicable to imaging and inspection systems used with a wide variety of planar and semi-planar objects including but not limited to X-ray inspection of printed circuit boards (PCBs) and integrated circuits.

In one aspect of the invention, a method of brightness correction of an image is provided. The method comprises a step of measuring one or more brightness values for each pixel in the image. The method further comprises a step of computing a corrected brightness for each pixel using a closed form equation. The method uses knowledge of the location of an illumination source.

In yet another aspect of the invention, a method of brightness correction of an image is provided that does not require knowledge of the location of the source of illumination. The method comprises a step of measuring one or more brightness values for each pixel in the image. The method further comprises a step of minimizing a function that represents a sum of the square of a difference between pairs of corrected brightness values for symmetrically located pixels. The result of the step of minimizing is a set of corrected brightness values and a set of geometry parameters that specify the location of the source.

In yet another aspect of the invention, an apparatus for brightness correction is provided. The apparatus of the present invention is a computer having a memory. A computer program is stored in the computer memory. The computer program implements the method of the present invention.

In still yet another aspect of the invention, an imaging system for imaging planar and semi planar objects is provided. The imaging system comprises point source illumination of the object and the apparatus of the present invention described above, which implements one or both of the methods of the invention described above. The imaging system images a wide variety of planar and semi-planar objects, including but not limited to X-ray inspection of printed circuit boards (PCBs) and integrated circuits.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

The present invention is a novel method of and an apparatus for brightness correction for imaging systems. In particular, the brightness correction method and apparatus of the present invention correct for non-object related brightness characteristics of a point source illumination. More particularly, the method and apparatus seek to minimize detrimental effects in the observed or measured brightness of an image that are due to the illumination unevenness associated with using a point source illumination geometry to illuminate an object being imaged. The method and apparatus are applicable to imaging of any planar or nearly planar object and to any type of illumination source that may be reasonably approximated as or equivalent to a point source.

Figure 1:
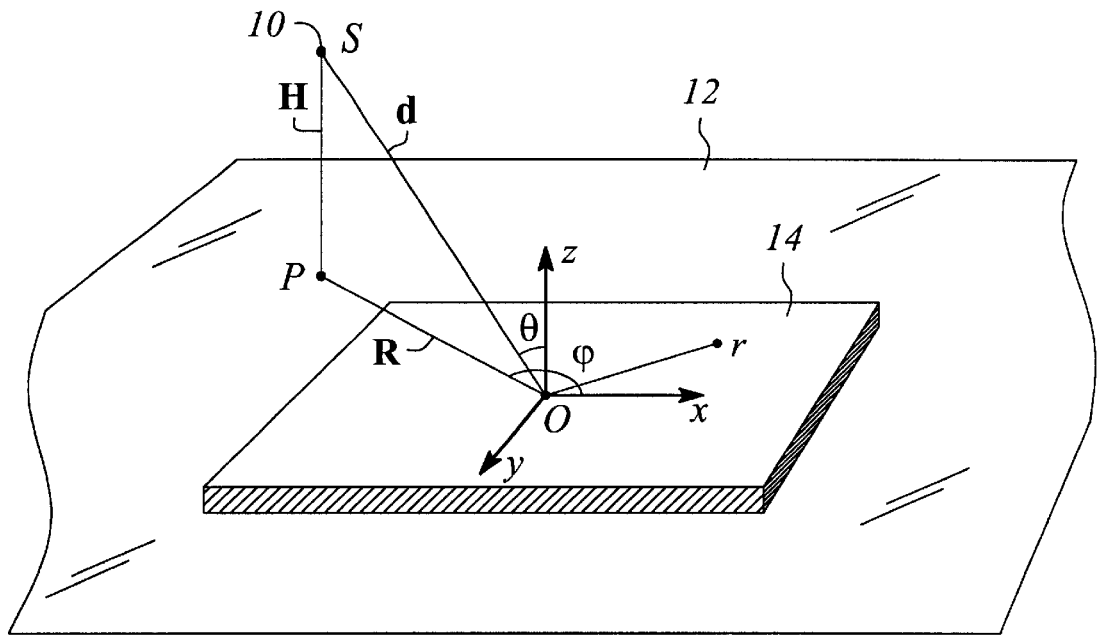
FIG. 1 illustrates a model of an imaging system that illuminates an object in a planar surface with a point source in accordance with the present invention.

FIG. 1 illustrates a model of an imaging system having a point source geometry comprising a point source 10 of illumination located above a planar surface 12. A 3-dimensional object 14 being imaged is located above or on the planar surface 12 and is positioned between the illumination point source 10 and the planar surface 12. The point source 10 is located near to and illuminates the planar surface 12 using some form of illumination, including but not limited to electromagnetic radiation such as microwaves, X-rays, visible light, or Ultraviolet light and acoustic energy such as ultrasound. For the purposes of this discussion, a point source of illumination is an illumination source that can be reasonably approximated as an isotropic radiator having a point-like geometry. In other words, the radiation intensity produced by the source is characterized by surfaces of equal intensity that are approximately spherical.

An image or picture of the object is created by the imaging system by measuring and recording the intensity or magnitude of the illuminating radiation that either passes through or reflects from the object 14. In either case, the image typically consists of a large number of intensity measurements taken and recorded at a large number of points across the planar surface 12. The individual measurements that make up the picture are often associated with small rectilinear regions or quasi-rectilinear regions of the surface. The corresponding regions of the image formed from the individual measurements are referred to as pixels. Therefore, the picture can be said to consist of a matrix or grid of pixels, each one of the pixels recording the brightness or intensity of the interaction between the object and the illumination. Unless otherwise noted, the term 'pixel', as used herein, interchangeably will refer to the notion of both individual measurements that make up the image and the regions of the planar surface 12 and the object 14 being imaged.

For purposes of the discussion hereinbelow, assume that a Cartesian coordinate system is used to define the relative locations and orientations of the point source 10, planar surface 12 and object 14. The Cartesian coordinate system is illustrated in FIG. 1 as three arrows labeled x, y, and z corresponding to an x-axis, a y-axis and a z-axis of the coordinate system, respectively. Furthermore, assume that the planar surface 12 is located and oriented such that the planar surface lies in an x-y plane of the Cartesian Coordinate system containing the origin O=(0,0,0). Moreover assume that the object 14 is relatively planar and that the object 14 is lying on the planar surface 12 centered approximately at the origin O. One skilled in the art would readily recognize that the choice of the Cartesian coordinate system and the choice of the x-y plane are totally arbitrary and that the choice merely facilitates discussion herein.

As illustrated in FIG. 1 and for discussion purposes only, the point source 10 is located above the planar surface 12 at a point S given by the coordinates $S=(x_s, y_s, z_s)$, where the value of $z_s$ is greater than zero. Therefore, the point source 10 is located above a point $P=(x_s, y_s)$ on the planar surface 12. A vector H connects the point P to the point S and has a length H that is the height of the point source 10 above the surface 12. The length H of the vector H is equal to the absolute value or magnitude of the coordinate $z_s$. A vector d having a length d connects the location S of the point source 10 and the origin O. When the vector d is projected onto the x-y plane, the projection defines a vector R lying in the x-y plane. The vector R connects the point P to the origin O and has a length R. Let the angle between the vector R and the x-axis be defined as $\Phi$. The angle $\Phi$ is the angular location of the point source 10 with respect to the Cartesian coordinate system and sometimes is referred to the azimuthal angle of the point source 10. Furthermore, let the angle between the vector d and the z-axis be defined as $\theta$. The angle $\theta$ is a second angular location of the point source 10 and sometimes is referred to as the elevation angle of the point source 10. Note that the length d of vector d, and the angles $\Phi$ and $\theta$ uniquely define the location S of the point source 10 and thus, are equivalent to the coordinates $(x_s, y_s, z_s)$. Once again, the above-described point source 10 location S is totally arbitrary and the vectors R, d, and H along with the angles $\Phi$ and $\theta$ are so defined to facilitate this discussion. The set of values R, H, and $\Phi$ are referred to hereinbelow as source geometry parameters.

Let an image be a collection of N pixels and let the pixels be indexed on n, where n=1, ..., N. Furthermore, let the measured brightness associated with an n-th pixel be designated as $f_n$. The pixel brightness $f_n$ is equivalent to the observed brightness $f(x_n, y_n)$ of a small region of the surface 12 that corresponds to the pixel. The coordinates $(x_n, y_n)$ define the location of the region of the surface 12 corresponding to the n-th pixel. Thus the image is a matrix of brightness values $f_n = f(x_n, y_n)$ for all n=1, ..., N.

When an image or picture is taken of the object 14 illuminated by source 10, the brightness recorded in the image will be a function of both the characteristics of the object 14 (i.e. reflectivity and/or transmissivity) and the location of the source 10 relative to the object 14. The method of the present invention removes the effects of the location of the source 10 from the recorded brightness, thereby leaving a picture that essentially depends on the characteristics of the object 14.

Figure 2:
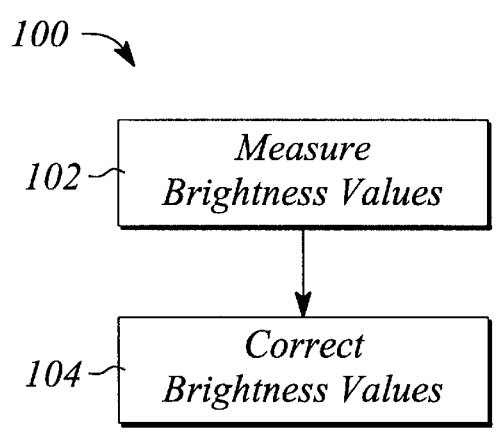
FIG. 2 illustrates a flow chart of a method of brightness correction of the present invention.

A flow chart of a method of brightness correction 100 of the present invention is illustrated in FIG. 2. The method 100 comprises the steps of measuring 102 one or more brightness value(s) $f_n$ for each of the N pixels in the image. Typically, one brightness value $f_n$ is measured 102 for each pixel in a black and white or gray scale image while three or more, one for each primary color, may be measured 102 for each pixel in a color image. The step of measuring 102 may be an explicit step of the method in that a set of measurements is actually taken during the application of the method 100. Alternatively, the step of measuring 102 can be an implicit step in that measurements are taken at some point prior to the application of the method 100 and thus, are available to the method 100.

The method 100 further comprises the step of correcting 104 the measured brightness values $f_n$ for a brightness variation or unevenness due to the use of the point source 10 to illuminate the object 14. Recall that the relative brightness variation from one pixel to another due to illumination by the point source 10 is entirely a function of the location of the point source 10 relative to the object 14. Therefore, the step of correcting 104 can be accomplished on a pixel by pixel basis using only knowledge of the source 10 and object 14 locations and the measured brightness values $f_n$. Advantageously however, the step of correcting 104 also can be used to normalize the overall brightness to a brightness value $f_n$ at the origin O.

Thus, the step of correcting 104 uses the measured brightness values $f_n$ of the step of measuring 102 and yields corrected brightness values $g_n$. In the step of correcting 104, the measured brightness values $f_n$ are multiplied by a correction factor $B(\cdot)$ that is a function of the pixel location $(x_n, y_n)$ and the source geometry parameters $(R, H, \Phi)$. Equations (1) (2) and (3) are used in the step of correcting 104, $$g_n = f_n \cdot B(R, H, \Phi, x_n, y_n) \quad (1)$$

$$f_n = f(x_n, y_n) \forall n=1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

where, as described hereinabove, R the length of a vector R that gives the location of the source 10 in the x-y plane, H is the length of the vector H that is the height of the source 10 above the x-y plane, and the azimuthal angle $\Phi$ is the angle between the vector R and the x-axis. Equations (1), (2) and (3) both normalize the brightness value with respect to a brightness value for the pixel at the origin O and remove or 'cancel out' the brightness effects of the variation of distance from the source 10 to the point on the surface 12 corresponding to the pixel. As such, the corrected brightness values $g_n$ produced by the step of correcting 104 advantageously will be corrected for the illumination intensity variations of the point source 10.

If the location of the source 10 at the time of performing the step of measuring 102 is known exactly in terms of the source geometry parameters $(R, H, \Phi)$, then the method 100 will eliminate the source related brightness variation exactly, where the variation is due to the variation of the distance $d(x,y)$ between the source 10 and points in the planar surface 12 corresponding to the pixels of the picture. However, by and large it is not possible to know the exact location of the source 10 and thus, the accuracy of the knowledge of the source location will affect the accuracy of the brightness correction according to the method 100. In particular, the accuracy of the values of R, H and $\Phi$ used in the method 100 will affect the accuracy of the correction produced in the step of correcting 104. One skilled in the art can readily determine how inaccuracies in the knowledge of the location of the source 10 will affect the accuracy of the correction provided by the method 100. Moreover, one skilled in the art can determine without undue experimentation whether or what level of accuracy in the values of R, H and $\Phi$ is sufficient for a given imaging or inspection task. Furthermore, one skilled in the art will readily recognize that other equivalent forms of equations (1), (2), and (3) can be derived that will yield the same correction and therefore, are considered to be within the scope of this invention. For example, one such equivalent form can be derived from equation (1) by replacing H with $z_s$ and R with $(x_s^2+y_s^2)^{1/2}$.

By way of an example of the application of the method 100, consider the brightness correction of an image taken of a PCB using an X-ray point source. For simplicity, the image of the example consists of N=16 pixels even though in practice, there are typically millions of pixels and associated brightness values $f_n$ that make up an image. Moreover, assume that the measured brightness values $f_n$ produced by the step of measuring 102 in this example are given by the matrix of equation (4a) for (x, y) values given by the matrix of equation (4b).

$$f_n = \begin{bmatrix} 0.1819 & 0.2696 & 0.3129 & 0.2366 \\ 0.2490 & 0.3517 & 0.4418 & 0.3644 \\ 0.6752 & 1.4519 & 2.8567 & 1.5937 \\ 2.7351 & 7.4743 & 22.5077 & 8.5579 \end{bmatrix} \quad (4a)$$

$$(x_n, y_n) = \begin{bmatrix} (-2,-2) & (-1,-2) & (1,-2) & (2,-2) \\ (-2,-1) & (-1,-1) & (1,-1) & (2,-1) \\ (-2,1) & (-1,1) & (1,1) & (2,1) \\ (-2,2) & (-1,2) & (1,2) & (2,2) \end{bmatrix} \quad (4b)$$

Finally, assume that the location of the source 10 is given for this example by R=2.5, H=1.3, and $\Phi$=1.344 radians. The corrected brightness values resulting from the application of the step of correcting 104 using equation (1), (2) and (3) to the brightness values of equation (4a) are given in the matrix of equation (4c) below.

$$g_n = \begin{bmatrix} 1.2 & 1.4 & 1.4 & 1.2 \\ 1.0 & 1.0 & 1.0 & 1.0 \\ 1.0 & 1.0 & 1.0 & 1.0 \\ 3.0 & 3.0 & 3.0 & 3.0 \end{bmatrix} \quad (4c)$$

In equations (4a), (4b) and (4c), corresponding values of $f_n$, $(x_n, y_n)$, and $g_n$, having the same index value n, are in corresponding locations in the matrices. Note that no units are specified for the (x,y), R and H values in this example. That is because the units cancel out in the equations (1), (2), and (3) when they are the same units. In this example, the units were made the same for convenience.

As discussed above, the corrected brightness values $g_n$ of equation (4c) can represent a gray scale of a black and white picture. Alternately, the corrected brightness values $g_n$ may be the brightness associated with each of three primary colors of a color image. In the case of color images, the step of correction 104 is simply applied separately to brightness values $f_n$ corresponding to each of the primary colors for each of the pixels.

In some instances, the knowledge of the location of the source 10 given in terms of the values of H, R, and Φ, or their equivalents, is not available or is not known with sufficient accuracy to provide the correction desired. Advantageously in these situations, the brightness correction can be accomplished by finding a set of geometry parameters (R, H, Φ) or their equivalents that minimize an error value E of equation (5a)

$$E = \sum_{i,j} (g_i - g_j)^2 \quad (5a)$$

where $g_i$ and $g_j$ are pairs of corrected brightness values given by equations (1), (2), and (3) for pixels located symmetrically on opposite sides of a line equivalently bisecting both the image and the surface 12 at an angle corresponding to the azimuthal angle φ with respect to the x-axis. The pairs of corrected brightness values $g_i$ and $g_j$ depend, in turn, on the geometry parameters and the measured brightness values $f_i, f_j$ as can be seen in equations (5b) and (5c).

$$g_k = f(x_k, y_k) \cdot B(R, H, \varphi, x_k, y_k) \forall k = i \text{ or } j \quad (5b)$$

$$B(R, H, \varphi, x_k, y_k) \equiv \left( \frac{(R \cdot \cos(\varphi) - x_k)^2 + (R \cdot \sin(\varphi) - y_k)^2 + H^2}{R^2 + H^2} \right)^{\frac{3}{2}} \quad (5c)$$

The error value E is the sum of the square of the differences between the corrected brightness values of the pairs of symmetrically located pixels. In other words, the minimization consists of finding a set of values for R, H, and Φ that minimizes the error value E given a set of measured brightness values $f_n$. The function for the error value E is essentially a Least Squares form. One skilled in the art would readily recognize that other equations for the error value E, such as the sum of the absolute value of the differences, would work in place of equation (5a). All such other equations are within the scope of the present invention.

Figure 3:
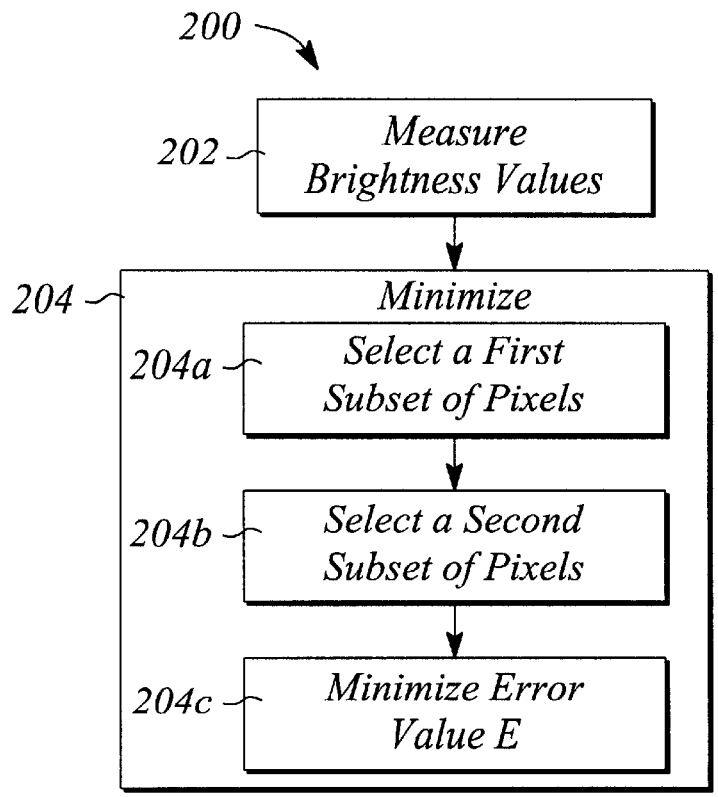
FIG. 3 illustrates a flow chart of another method of brightness correction of the present invention.
Figure 4:
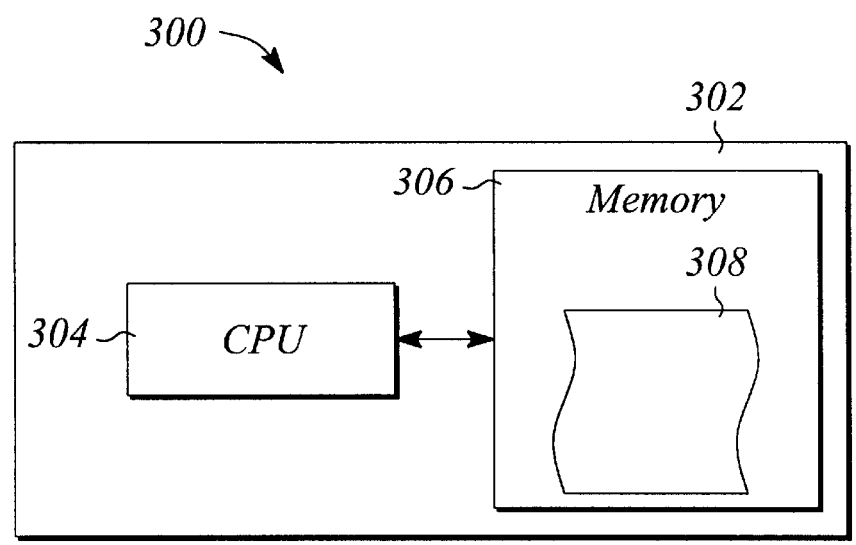
FIG. 4 illustrates a block diagram of an apparatus for brightness correction of the present invention.

FIG. 3 illustrates a method 200 of brightness correction of the present invention that does not require knowledge of the source location 10. The method 200 of brightness correction can be applied when the location of the source 10 is either completely unknown or when the location in terms of the values of the source geometry parameters (R, H, Φ), is known with less than sufficient accuracy for a given application. In particular, the values of source geometry parameters R, H, and Φ can be calculated and/or their respective accuracies can be increased with the use of the method 200.

Referring to FIG. 3, the method 200 of brightness correction comprises the step of measuring 202 the brightness values $f_n$ for the pixels of the image. The step of measuring 202 is identical to the step of measuring 102 of the method 100 of the present invention.

The method 200 further comprises the step of minimizing 204 the error value E, a sum of the square of the difference between the corrected brightness values $g_i$ and $g_j$ for symmetrically located pairs of pixels. The values of R, H, and Φ that minimize the error value E of equation (3) represent the true and accurate location of the source 10, ideally subject only to the precision of the minimization.

In practice, the accuracy of the values obtained for R, H, and Φ through the minimization of the error value E are also subject to statistical bias related to characteristics of the object being imaged. Generally, it has been found that these so-called bias effects are small enough to make the method 200 useful in most applications. In addition, while it is possible to find all three values R, H, and Φ, in practice it is easier to find R and H alone using a known value for Φ. Thus, it is preferred that a known value of Φ be available for method 200 and that the minimization be used to determine only the values for R and H. This is not really a limitation since most imaging systems using point sources generally provide adequately accurate information regarding the value of Φ and in the cases where the value for Φ is not known, method 200 can advantageously find all three values R, H, and Φ.

The step of minimizing 204 comprises the step of selecting 204a a first subset of pixels on one side of a line bisecting the image. The line bisecting the image is a line in the image having a location and orientation corresponding to a line that bisects the planar surface 12 at an angle Φ with respect to the x-axis. The step of minimizing 204 further comprises the step of selecting 204b a second subset of pixels on the other side of the bisecting line. The second subset consists of pixels symmetrically located across the line from those in the first subset. A symmetrical pair of pixels are defined as a pair of pixels lying on a line that is perpendicular to the line bisecting the image, the pixels being equal distance from and on opposite sides of the line. Thus, a symmetrically located pair of pixels is defined as a pair of pixels, one from the first subset and one from the second subset. The identification of a pair of pixels or equivalently, a pair of locations $(x_i, y_j)$, $(x_j, y_j)$ for the pair of pixels, uniquely identifies a pair of measured brightness values $f_i$, $f_j$ that corresponds to the pixel pair.

The step of minimizing 204 further comprises the step of minimization 204c in which a minimization technique is used to minimize the error value E of equation (5a). Any one of a number of available minimization techniques known in the art can be used to perform the minimization 204c. The Least Squares form of equation (5a) implies that a minimization methodology adapted to a quadratic solution surface is preferred. Therefore, the step of minimization 204c of the step of minimizing 204 is preferably performed using one of several minimization algorithms such as the Modified Newton's Method, Conjugate Gradient, or Powell's Method. Note that the solution surface of the minimization 204c associated with the error value E of equation (5a) is only 3-dimensional since only optimum values of R, H, and Φ are being sought. In addition, the solution surface is essentially a quadratic surface. Experience has shown that the modified Newton's method, which works well for low dimensional quadratic solution surface minimizations, consistently produces acceptable results. One skilled in the art would readily recognize that there are a large number of applicable minimization techniques that can be used to minimize the error value E. All such applicable minimization techniques are within the scope of this invention.

Selecting 204a, 204b the subsets of pixels in the step of minimizing 204 normally involves choosing all of the pixels on one side of the line bisecting the image into the first subset of pixels and placing all of the pixels on the other side of the line in the second subset. Thus, all of the N pixels are either in the first subset or the second subset. In this case the index i has N/2 values, as does the index j. While the goal of the step of minimizing 204 is to find an optimum set of geometry parameters (R, H, and Φ), a by-product of when all of the pixels are in either the first or the second subset is that a complete set of corrected brightness values $g_n$ for n=1, ..., N is obtained as well.

In another embodiment of method 200 (not illustrated), a step of minimizing 204' comprises the steps of selecting 204a' a first subset and selecting 204b' a second subset, wherein the first and second subsets together do not include all of the N pixels of the image. The step of minimizing 204' further comprises the step of minimization 204c', which is essentially identical to the step of minimization 204c. The step of minimizing 204' further comprises the step of correcting 204d' the remaining pixels that were not included in the first and second subsets in the step of selecting.

For example, in an ideal case where the object 14 being imaged is completely homogeneous in terms of its image characteristics, the first and second subsets need only include a number of pixels being equal to or slightly greater than 3. This is because there are only three variables or unknowns, the three geometry parameter (R, H, Φ) that need be determined by the step of minimization 204c'. Once the geometry parameters have been determined by the step of minimization 204c', the step of correcting 204d' can be used to correct the measured brightness $f_n$ of all of the pixels not included in the step of minimization 204c'. The use of a homogeneous object to find the geometry parameters (R, H, Φ) is sometimes referred to as calibrating the imaging system. Likewise, the step of minimizing 204' can be used to deal with pixels that fall on the bisecting line or for pixels that do not, for one reason or another, have a symmetrical pixel on the other side of the bisecting line.

The reason that the step of minimizing 204, 204' works with non-homogeneous objects is that there are generally a large number of pixel pairs being used. The object-related brightness variations between pairs are largely random. Thus, by using a large number of pixel pairs in the minimization step 204, 204', the inhomogeneity is averaged or tends to 'cancel-out', thereby yielding sufficiently accurate values for R, H, and Φ.

In another aspect of the invention, an apparatus 300 is provided that corrects for brightness of images taken of planar and nearly planar objects 14 while illuminated by a point source of illumination. The apparatus 300 comprises a computer 302 having a central processing unit 304 and computer memory 306. A computer program 308 is stored in the computer memory 306. The computer program implements the steps of one or both of the methods 100, 200. In one embodiment, the computer program 308 implements the step of computing 104 the corrected brightness values $f_n$ using equations (1), (2) and (3). In a second embodiment, the computer program 308' implements the step of minimizing 204 using equations (5a), (5b) and (5c) and a minimization method such as the Modified Newton's Method, as described above. The measured brightness values $f_n$ are stored in the memory 306. The computer program 308, 308' that implements the method 100 and/or 200 is then used to compute the corrected brightness values $g_n$ in the case of method 100 or the corrected brightness values $g_n$ and source geometry parameters R, H, and φ in the case of method 200. Given the discussion hereinabove including equations (1), (2), (3), (5a), (5b), and (5c), one skilled in the art could readily generate just such a computer program without undue experimentation. Further, the apparatus 300 may further comprise, or be used with, point source illumination equipment, as described above. As such, another aspect of the present invention is an imaging system that comprises point source illumination to illuminate a planar object (that includes a semi-planar object) under investigation and further comprises the apparatus 300 and implements the methods 100, 200 of the present invention. Examples of imaging systems that use point sources and thus can use apparatus 300 are an X-ray Laminography system, an X-ray Laminography system that uses Tomosynthesis, and an X-ray Tomography system.

Thus, there has been described novel methods 100, 200 of brightness correction and an apparatus 300 for brightness correction applicable to images taken of a planar object illuminated by an imaging system that employs point source illumination. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A method of correcting the brightness of an image for point source illumination effects, the image being of an object lying on a plane, the illumination point source being located above the plane, the image consisting of pixels each having a brightness value, the method comprising the steps of:

measuring brightness values $f_n$ for a plurality of pixels in an image, the pixels corresponding to points in the object at locations given by $(x_n, y_n)$; and correcting the measured brightness values $f_n$ for point source illumination effects to produce corrected brightness values $g_n$, wherein $g_n$ is computed from $f_n$ using equations (1), (2) and (3) given by $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

and wherein $x_n$ and $y_n$ are coordinates of the locations of each of the pixels in a Cartesian Coordinate system, H is a height of the point source illumination above the plane, Φ is an azimuthal angle of the point source illumination relative to an x-axis in the plane, and R is a distance from the point source illumination to an origin of the Cartesian Coordinate system.

2. A method for correcting the brightness of an image taken of an object lying on a plane, the method correcting for effects of image illumination by a point source, the point source being located above the plane, the image consisting of pixels each having a brightness value, the method comprising the steps of:

measuring brightness values $f_n$ for a plurality of pixels in an image, the pixels corresponding to points in the object at locations given by $(x_n, y_n)$; and minimizing an error value E to find a set of source geometry parameters R, H and a set of corrected brightness values $g_n$, wherein the error value is given by equations (5a), (5b) and (5c), $$E = \sum_{i,j} (g_i - g_j)^2 \quad (5a)$$

$$g_k = f(x_k, y_k) \cdot B(R, H, \Phi, x_k, y_k) \forall k = i \text{ or } j \quad (5b)$$

$$B(R, H, \varphi, x_k, y_k) \equiv \left( \frac{(R \cdot \cos(\varphi) - x_k)^2 + (R \cdot \sin(\varphi) - y_k)^2 + H^2}{R^2 + H^2} \right)^{\frac{3}{2}} \quad (5c)$$

wherein $g_i$ and $g_j$ are corrected brightness values for pairs of pixels, members of each pair being located symmetrically on opposite sides of a line bisecting a surface of the plane, the line having an angle of $\Phi$ with respect to an x-axis of a Cartesian Coordinate system.

3. The method of claim 2, wherein the set of source geometry parameters further includes the angle $\Phi$ and the step of minimizing further finds a value of the angle $\Phi$.

4. A method for correcting the brightness of an image taken of an object lying on a plane, the method correcting for effects of image illumination by a point source, the point source being located above the plane, the image consisting of pixels each having a brightness value, the method comprising the steps of:

measuring brightness values $f_n$ for a plurality of pixels in an image, the pixels corresponding to points in the object at locations given by $(x_n, y_n)$; and minimizing an error value E to find a set of source geometry parameters R, H, wherein the error value is given by equations (5a), (5b) and (5c), $$E = \sum_{i,j} (g_i - g_j)^2 \quad (5a)$$

$$g_k = f(x_k, y_k) \cdot B(R, H, \Phi, x_k, y_k) \forall k = i \text{ or } j \quad (5b)$$

$$B(R, H, \varphi, x_k, y_k) \equiv \left( \frac{(R \cdot \cos(\varphi) - x_k)^2 + (R \cdot \sin(\varphi) - y_k)^2 + H^2}{R^2 + H^2} \right)^{\frac{3}{2}} \quad (5c)$$

wherein $g_i$ represents corrected brightness values for a first subset of pixels located on one side of a line bisecting a surface of the plane upon which the object is resting, and $g_j$ represents corrected brightness values for a second subset of pixels symmetrically located on an opposite side of the line from the first subset, the line having an angle of $\Phi$ with respect to an x-axis of a Cartesian Coordinate system.

5. The method of claim 4, further comprising the step of: correcting the measured brightness values $f_n$ for point source illumination effects to produce corrected brightness values $g_n$, wherein $g_n$ is computed from $f_n$ using equations (1), (2) and (3) given by $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

and wherein $X_n$ and $y_n$ are coordinates of the locations of each of the pixels in a Cartesian Coordinate system, H is a height of the point source illumination above the plane, $\Phi$ is an azimuthal angle of the point source illumination relative to an x-axis in the plane, and R is a distance from the point source illumination to an origin of the Cartesian Coordinate system, and wherein the geometry parameters R, H are determined in the step of minimizing.

6. The method of claim 4, wherein the set of source geometry parameters further includes the angle $\Phi$ and the step of minimizing further finds a value of the angle $\Phi$.

7. The method of claim 6, further comprising the step of: correcting the measured brightness values $f_n$ for point source illumination effects to produce corrected brightness values $g_n$, wherein $g_n$ is computed from $f_n$ using equations (1), (2) and (3) given by $$g_n = f_n \cdot B(R, H, \Phi, x_n, y_n) \quad (1)$$

$$f_n = f(x_n, y_n) \forall n = 1 \ldots N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

and wherein $x_n$ and $y_n$ are coordinates of the locations of each of the pixels in a Cartesian Coordinate system, H is a height of the point source illumination above the plane, $\Phi$ is an azimuthal angle of the point source illumination relative to an x-axis in the plane, and R is a distance from the point source illumination to an origin of the Cartesian Coordinate system, and the geometry parameters R, H and $\Phi$ are determined in the step of minimizing.

8. The method of claim 4, wherein the step of minimizing further comprises the steps of:

selecting the first subset of pixels; and selecting the second subset of pixels.

9. An apparatus that corrects for brightness of an image taken of an object with point source illumination comprising:

a computer having a central processing unit; computer memory; and a computer program stored in the computer memory, the computer program implementing equations (1), (2) and (3), $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

wherein $g_n$ is a corrected brightness value, $f_n$ is a measured brightness value, $x_n$ and $y_n$ are coordinates in a Cartesian Coordinate system representing a location of an image pixel, H is a height of an illumination point source above a plane of the object being illuminated, Φ is an azimuthal angle of the point source relative to an x-axis in the plane, and R is a distance from the point source to an origin of the Cartesian Coordinate system.

10. An apparatus that corrects for brightness of an image taken of an object with point source illumination comprising:

a computer having a central processing unit; computer memory; and a computer program stored in the computer memory, the computer program implementing equations (5a), (5b) and (5c) that define an error value E, and performing a minimization of the value E to find values for a set of source geometry parameters R, H, $$E = \sum_{i,j} (g_i - g_j)^2 \quad (5a)$$

$$g_k = f(x_k, y_k) \cdot B(R, H, \Phi, x_k, y_k) \forall k = i \text{ or } j \quad (5b)$$

$$B(R, H, \varphi, x_k, y_k) \equiv \left( \frac{(R \cdot \cos(\varphi) - x_k)^2 + (R \cdot \sin(\varphi) - y_k)^2 + H^2}{R^2 + H^2} \right)^{\frac{3}{2}} \quad (5c)$$

wherein $g_i$ and $g_j$ are corrected brightness values for pairs of pixels, members of each pair being located symmetrically on opposite sides of a line bisecting a surface of the plane, the line having an angle of Φ with respect to an x-axis of a Cartesian Coordinate system.

11. The apparatus of claim 10, wherein the set of source geometry parameters further includes the angle Φ and the minimization further finds a value of the angle Φ.

12. The apparatus of claim 10, wherein the computer program further implement equations (1), (2) and (3), $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

wherein $g_n$ is a corrected brightness value, $f_n$ is a measured brightness value, $x_n$ and $y_n$ are coordinates in a Cartesian Coordinate system representing a location of an image pixel, H is a height of an illumination point source above a plane of the object being illuminated, Φ is an azimuthal angle of the point source relative to an x-axis in the plane, and R is a distance from the point source to an origin of the Cartesian Coordinate system.

13. An imaging system for imaging an object lying on a plane comprising:

a point source illumination that illuminates the object; and
an apparatus that corrects for brightness of an image taken of the object comprising a computer having a central processing unit; computer memory; and a computer program stored in the computer memory, the computer program implementing equations (1), (2) and (3), $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

wherein $g_n$ is a corrected brightness value, $f_n$ is a measured brightness value, $x_n$ and $y_n$ are coordinates in a Cartesian Coordinate system representing a location of an image pixel, H is a height of the illumination point source above the plane of the object being illuminated, Φ is an azimuthal angle of the point source relative to an x-axis in the plane, and R is a distance from the point source to an origin of the Cartesian Coordinate system.

14. An imaging system for imaging an object lying on a plane comprising:

a point source illumination that illuminates the object; and
an apparatus that corrects for brightness of an image taken of the object comprising a computer having a central processing unit; computer memory; and a computer program stored in the computer memory, the computer program implementing equations (5a), (5b) and (5c) that define an error value E, and performing a minimization of the value E to find values for a set of source geometry parameters R and H, $$E = \sum_{i,j} (g_i - g_j)^2 \quad (5a)$$

$$g_k = f(x_k, y_k) \cdot B(R, H, \Phi, x_k, y_k) \forall k = i \text{ or } j \quad (5b)$$

$$B(R, H, \varphi, x_k, y_k) \equiv \left( \frac{(R \cdot \cos(\varphi) - x_k)^2 + (R \cdot \sin(\varphi) - y_k)^2 + H^2}{R^2 + H^2} \right)^{\frac{3}{2}} \quad (5c)$$

wherein $g_i$ and $g_j$ are corrected brightness values for pairs of pixels, members of each pair being located symmetrically on opposite sides of a line bisecting a surface of the plane, the line having an angle of Φ with respect to an x-axis of a Cartesian Coordinate system.

15. The imaging system of claim 14, wherein the computer program further implements equations (1), (2) and (3), $$g_n = f_n \cdot B(R, H, \Phi, x_n, y_n) \quad (1)$$

$$f_n = f(x_n, y_n) \forall n = 1, \ldots, N \quad (2)$$

$$B(R, H, \varphi, x_n, y_n) \equiv \left( \frac{(R \cdot \cos(\varphi) - x_n)^2 + (R \cdot \sin(\varphi) - y_n)^2 + H^2}{R^2 + H^2} \right)^{\frac{3}{2}} \quad (3)$$

wherein $g_n$ is a corrected brightness value, $f_n$ is a measured brightness value, $x_n$ and $y_n$ are coordinates in a Cartesian Coordinate system representing a location of an image pixel, H is a height of the illumination point source above the plane of the object being illuminated, Φ is an azimuthal angle of the point source relative to an x-axis in the plane, and R is a distance from the point source to an origin of the Cartesian Coordinate system.

16. The imaging system of claim 14, wherein the set of source geometry parameters further includes the angle Φ and the minimization further finds the value of the angle Φ.

17. The imaging system of claim 13, wherein the imaging system is an X-ray Laminography system or an X-ray Tomography system.

18. The imaging system of claim 14, wherein the imaging system is an X-ray Laminography system or an X-ray Tomography system.

19. The method of claim 2, wherein the step of minimizing the error value E comprises using a modified Newton's minimization method.

20. The apparatus of claim 10, wherein the computer program comprises using a modified Newton's minimization method.

21. The system of claim 14, wherein the computer program comprises using a modified Newton's minimization method.

* * * * *